United States Patent
Hagi (10) Patent No.: US 11,214,206 B2
(45) Date of Patent: Jan. 4, 2022

(54) PROTECTIVE TUBE WITH FIXING MEMBERS, AND WIRE HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventor: Masahiro Hagi, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 8 days.

(21) Appl. No.: 16/976,987

(22) PCT Filed: Feb. 21, 2019

(86) PCT No.: PCT/JP2019/006530
§ 371 (c)(1),
(2) Date: Aug. 31, 2020

(87) PCT Pub. No.: WO2019/171969
PCT Pub. Date: Sep. 12, 2019

(65) Prior Publication Data
US 2021/0001790 A1    Jan. 7, 2021

(30) Foreign Application Priority Data
Mar. 8, 2018    (JP) .............................. JP2018-041834

(51) Int. Cl.
*B60R 16/02*    (2006.01)
*H02G 3/04*    (2006.01)
(Continued)

(52) U.S. Cl.
CPC ........... *B60R 16/0215* (2013.01); *H01B 7/00* (2013.01); *H02G 3/04* (2013.01); *H02G 3/30* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 4,347,401 A | * | 8/1982 | Knudsen ................. | H01B 9/06 174/106 R |
| 9,666,955 B2 | | 5/2017 | Sugino | |

(Continued)

FOREIGN PATENT DOCUMENTS

| | | |
|---|---|---|
| JP | 2010-215010 A | 9/2010 |
| JP | 2013-017317 A | 1/2013 |

(Continued)

OTHER PUBLICATIONS

Apr. 23, 2019 Search Report issued in International Patent Application No. PCT/JP2019/006530.

*Primary Examiner* — Paresh H Paghadal
(74) *Attorney, Agent, or Firm* — Oliff PLC (57) ABSTRACT

An apparatus including: a protective tube that surrounds an electric wire that is routed in a vehicle; and a metallic fixing that is attached to the protective tube, and that is fixed to the vehicle, wherein: the protective tube includes a hole penetrating in a direction intersecting an axial direction of the protective tube, and the fixing is attached to an outer circumferential surface of the protective tube to cover the hole.

6 Claims, 5 Drawing Sheets

(51) Int. Cl.
*H02G 3/30* (2006.01)
*H02G 3/32* (2006.01)
*H01B 7/00* (2006.01)

(52) U.S. Cl.
CPC ............ *H02G 3/32* (2013.01); *B60R 16/0207* (2013.01); *H01B 7/0045* (2013.01)

(56) References Cited

U.S. PATENT DOCUMENTS

| | | | |
|---|---|---|---|
| 2002/0000499 A1* | 1/2002 | Aoki | B60R 16/0215 248/74.4 |
| 2013/0292154 A1* | 11/2013 | Aoyama | H05K 9/0088 174/105 R |
| 2014/0110011 A1 | 4/2014 | Omura et al. | |
| 2015/0136482 A1* | 5/2015 | Adachi | H02G 3/0468 174/72 A |
| 2015/0151693 A1 | 6/2015 | Inao et al. | |
| 2016/0144804 A1* | 5/2016 | Sugiura | B32B 27/12 296/183.1 |

FOREIGN PATENT DOCUMENTS

| | | |
|---|---|---|
| JP | 2016-058137 A | 4/2016 |
| JP | 2016-178260 A | 10/2016 |
| WO | 2014/034904 A1 | 3/2014 |

* cited by examiner

PROTECTIVE TUBE WITH FIXING MEMBERS, AND WIRE HARNESS

BACKGROUND

The present disclosure relates to a protective tube with a fixing member, and a wire harness.

A wire harness used for a vehicle such as a hybrid vehicle or an electric vehicle includes electric wires for electrically connecting a high-voltage battery and electric devices such as an inverter (see JP 2016-58137A, for example). In this wire harness, the outside of the electric wires is covered with a protective tube such as a corrugated tube or a metal pipe for the purpose of protecting the electric wires and electromagnetic shielding.

SUMMARY

In the case of an electric device such as a high-voltage inverter or a battery used in a vehicle such as a hybrid vehicle or an electric vehicle described above, a large current of, for example, several hundred amperes may flow in the electric wires. If a large current flows through an electric wire, the amount of heat generated in the electric wire increases and the temperature of the electric wire tends to rise. Accordingly, it is desired to improve the heat dissipation of a wire harness.

An exemplary aspect of the disclosure provides a protective tube with a fixing member, and a wire harness, which can improve heat dissipation.

An apparatus according to an exemplary aspect includes a protective tube that surrounds an electric wire that is routed in a vehicle, and a metallic fixing that is attached to the protective tube, and that is fixed to the vehicle, wherein the protective tube includes a hole penetrating in a direction intersecting an axial direction of the protective tube, and the fixing is attached to an outer circumferential surface of the protective tube to cover the hole.

A wire harness that solves the above issues includes the protective tube with a fixing, and the electric wire that is inserted into the protective tube.

According to the protective tube with a fixing and the wire harness of the present disclosure, heat dissipation can be improved.

DETAILED DESCRIPTION OF EMBODIMENTS

An embodiment of a wire harness will be described with reference to the drawings. Note that, in each drawing, for convenience of description, a part of the configuration may be exaggerated or simplified. Also, the dimensional ratio of each part may be different from the actual dimensional ratio.

Figure 1:
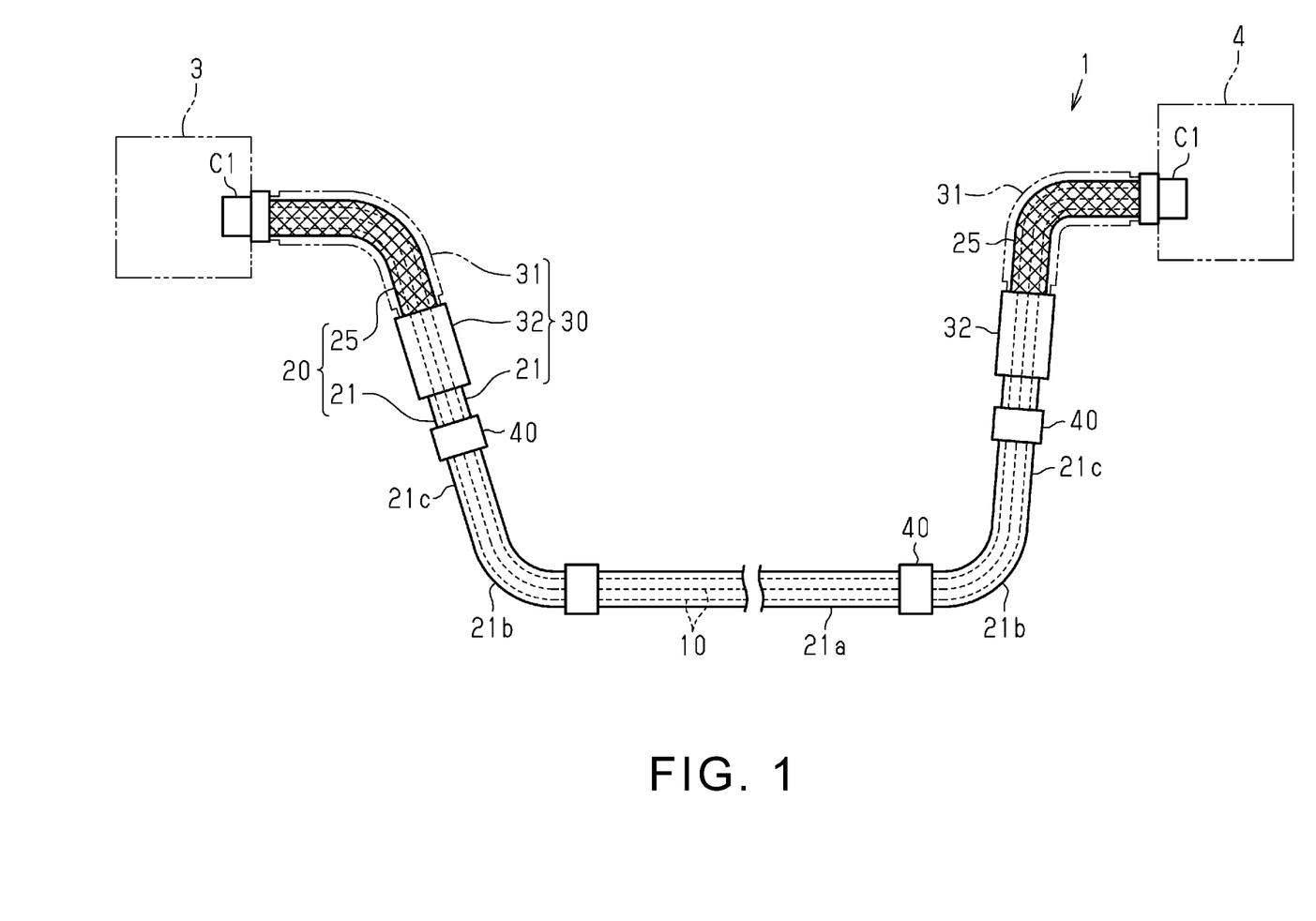
FIG. 1 is a schematic configuration diagram of a wire harness according to an embodiment.

A wire harness 1 shown in FIG. 1 electrically connects two or three or more electric devices (devices). The wire harness 1 of the present embodiment electrically connects an inverter 3 installed in the front part of a vehicle, such as a hybrid vehicle or an electric vehicle, to a high-voltage battery 4 installed behind the inverter 3 in the vehicle. The wire harness 1 is routed to pass under the floor of the vehicle, for example. The inverter 3 is connected to a wheel driving motor (not shown) that serves as a power source for driving the vehicle. The inverter 3 generates alternating-current (AC) power from the direct-current (DC) power of the high-voltage battery 4, and supplies the AC power to the motor. The high-voltage battery 4 can supply a voltage of, for example, several hundred volts.

The wire harness 1 includes a plurality of (two in FIG. 1) electric wires 10, a pair of connectors C1 attached to the two ends of the electric wires 10, an electromagnetic shield portion 20 that electromagnetically shields the plurality of electric wires 10, a protective tube 30 that completely surrounds the plurality of electric wires 10, and a plurality of (four in FIG. 1) metallic fixing members 40 (fixing). The protective tube 30 accommodating the plurality of electric wires 10 is fixed to a vehicle body or the like of the vehicle by the fixing members 40.

Figure 3:
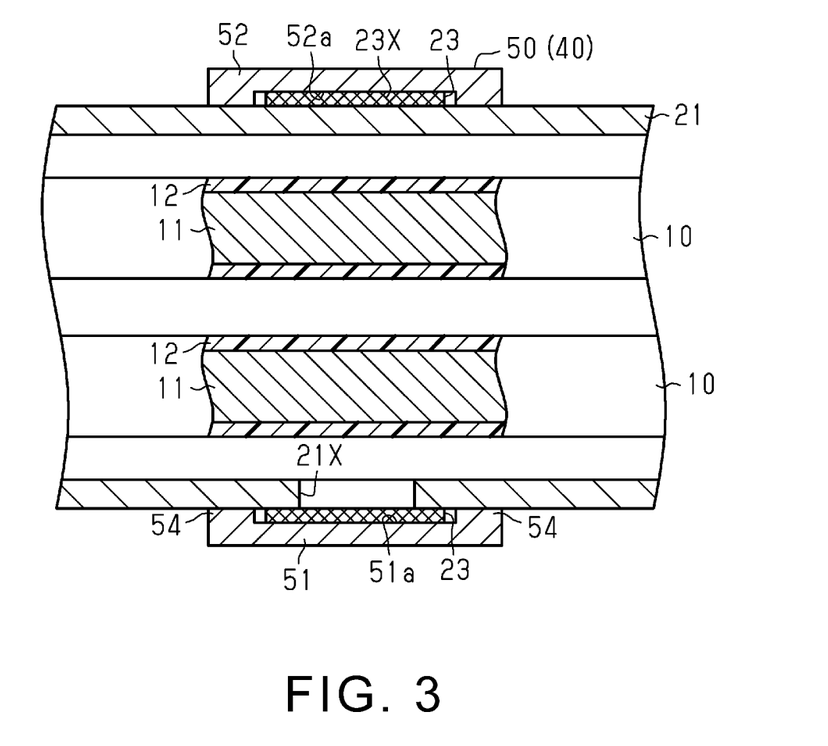
FIG. 3 is a schematic cross-sectional view of the wire harness in the embodiment.

As shown in FIG. 3, the electric wires 10 are covered electric wires each having a core wire 11 made of a conductor, and an insulating coating 12 coating the outer circumference of the core wire 11. Each electric wire 10 is formed in an elongated shape to extend in the front-rear direction of the vehicle, for example. As the core wire 11, for example, a twisted wire formed by twisting a plurality of metal strands, a single-core wire formed of one columnar (cylindrical, for example) metal rod having a solid structure inside, a tubular conductor (a pipe conductor) having a hollow structure, or the like can be used. Also, as the core wire 11, a twisted wire, a single-core wire, or a tubular conductor may also be used in combination. As the material of the core wire 11, for example, a metal material such as a copper-based material or an aluminum-based material can be used. The insulating coating 12 coats, for example, the outer circumferential surface of the core wire 11 over the entire circumference in a tightly adhered state. The insulating coating 12 is made of, for example, an insulating material such as synthetic resin. The insulating coating 12 can be formed by, for example, extrusion molding (extrusion coating) for the core wire 11.

Each electric wire 10 is, for example, a high-voltage electric wire that can handle a high voltage and a large current. Also, each electric wire 10 is, for example, a non-shielded electric wire that has no shield structure. As shown in FIG. 1, one end of each electric wire 10 is connected to an inverter 3 via the connector C1, and the other end of each electric wire 10 is connected to a high-voltage battery 4 via the connector C1.

The electromagnetic shield portion 20 has a long tubular shape as a whole. The electromagnetic shield portion 20 of the present example includes a metal pipe (a shield pipe) 21 positioned at an intermediate portion in the length direction thereof, protective members 23 (see FIG. 2) attached to the metal pipe 21, and braided members 25 positioned at the two ends in the length direction at portions that are not constituted by the metal pipe 21.

The metal pipe 21 is made of, for example, a metal material such as an aluminum-based material or an iron-based material. The metal pipe 21 of the present embodiment is made of an aluminum-based metal material. The metal pipe 21 is routed under the floor of the vehicle, and is routed by being bent into a predetermined shape corresponding to the configuration under the floor. The metal pipe 21 of the present example includes a straight portion 21a routed along the vehicle front-rear direction under the floor of the vehicle, bent portions 21b provided at the two ends of the straight portion 21a, and upward extending portions 21c extending from the respective bent portions 21b toward the vehicle upper side.

The metal pipe 21 electromagnetically shields the plurality of electric wires 10, and also protects the plurality of electric wires 10 from flying objects and water droplets. In other words, the metal pipe 21 functions not only as the electromagnetic shield portion 20 that electromagnetically shields the plurality of electric wires 10, but also as the protective tube 30 that protects the plurality of electric wires 10.

Figure 2:
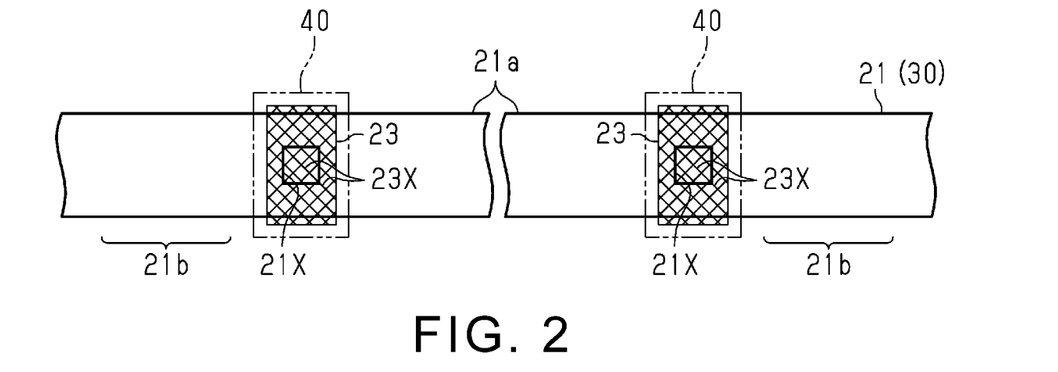
FIG. 2 is a schematic plan view of the wire harness in the embodiment.

As shown in FIG. 2, the metal pipe 21 has holes 21X formed at required locations (two locations in FIG. 2). The plurality of holes 21X are provided at predetermined intervals in the axial direction (extending direction) of the metal pipe 21. Each hole 21X is provided at a position in which the fixing member 40 is attached in the axial direction of the metal pipe 21, for example. Each hole 21X is provided in a portion of the metal pipe 21 suitable for draining water, for example. Each hole 21X is provided in the vicinity of the bent portion 21b of the straight portion 21a of the metal pipe 21, for example. As shown in FIG. 3, the hole 21X is formed to penetrate in a direction intersecting the axial direction of the metal pipe 21, that is, in a radial direction of the metal pipe 21. The hole 21X of the present example is formed to penetrate in a direction orthogonal to the axial direction of the metal pipe 21. The hole 21X of the present example is formed in the outer circumferential surface on the lower surface side (that is, the side closer to the ground) of the metal pipe 21 when the wire harness 1 is assembled to the vehicle, and opens downward. The opening shape of the hole 21X is not limited to a particular shape. The opening shape of the hole 21X can be formed in, for example, a circular shape, an elliptical shape, a semicircular shape, a rectangular shape, or a polygonal shape. As shown in FIG. 2, the holes 21X of the present example are formed as rectangular holes.

Each hole 21X is covered with a protective member 23. The protective member 23 has a mesh 23X that is smaller than the hole 21X. The protective member 23 is formed in a sheet shape.

Figure 4:
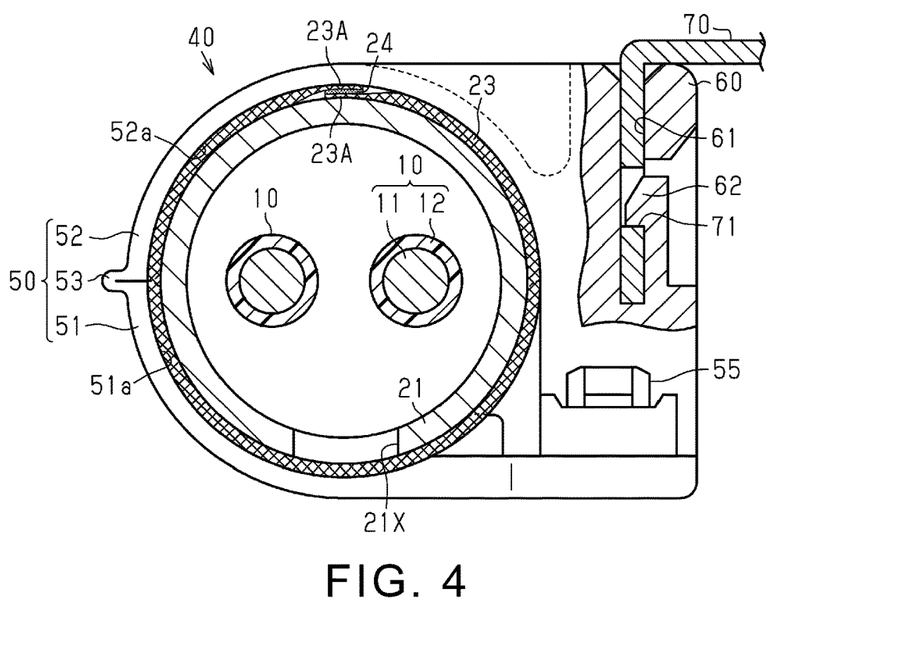
FIG. 4 is a schematic cross-sectional view of the wire harness in the embodiment.

As shown in FIGS. 2 to 4, the protective member 23 is formed to cover the hole 21X entirely. As shown in FIG. 4, the protective member 23 of the present example is formed to cover the outer circumferential surface of the metal pipe 21 over the entire circumference in the circumferential direction. In other words, the protective member 23 of the present example has a width that is wider than the width of the hole 21X extending in the axial direction of the metal pipe 21, and is formed in a substantially rectangular shape having a length capable of covering the outer circumferential surface of the metal pipe 21 over the entire circumference in the circumferential direction.

In the present embodiment, the sheet-like protective member 23 is bent into a tubular shape, and is wound around the outer circumferential surface of the metal pipe 21 at the position where the hole 21X is formed over the entire circumference in the circumferential direction. The protective member 23 is formed in a tubular shape by joining a pair of longitudinal end portions 23A, for example. In other words, a joint portion 24 is formed at the portion where the pair of end portions 23A of the protective member 23 are joined. The joint portion 24 may also be, for example, a portion joined by an adhesive or a portion joined by welding.

The protective member 23 is joined to the outer circumferential surface of the metal pipe 21, for example. The protective member 23 of the present example is joined to the entire circumference of the edge portion surrounding the hole 21X in the outer circumferential surface of the metal pipe 21. Also, the protective member 23 of the present example is joined to the outer circumferential surface of the metal pipe 21 over the entire circumference in the circumferential direction. The short-side end of the protective member 23 is joined to, for example, the outer circumferential surface of the metal pipe 21 over substantially the entire length thereof. As a method for joining the protective member 23 and the metal pipe 21, for example, joining with an adhesive or joining with a welding means such as heat welding or ultrasonic welding can be used.

The protective member 23 is, for example, a shield mesh formed by weaving a plurality of metal strands into a sheet shape. By joining the protective member 23 to the outer circumferential surface of the metal pipe 21, the metal pipe 21 and the protective member 23 are electrically connected to each other. The protective member 23, which is a shield mesh, together with the metal pipe 21, electromagnetically shields the plurality of electric wires 10. In other words, portions of each electric wire 10 exposed to the outside from the holes 21X of the metal pipe 21 are electromagnetically shielded by the protective members 23 (shield meshes). As a material of the metal strand forming the protective member 23, for example, a metal material such as a copper-based material or an aluminum-based material can be used. In the present embodiment, the metal strand forming the protective member 23 is made of the same metal material as the metal pipe 21 (in this case, an aluminum-based metal material).

Each braided member 25 shown in FIG. 1 is a tubular member formed by braiding a plurality of metal strands, and has flexibility. The braided members 25 are respectively connected to the two ends of the metal pipe 21 in the axial direction (extending direction) by connecting members such as crimping rings. In this manner, the braided members 25 and the metal pipe 21 are electrically connected, and the braided members 25 and the metal pipe 21 form a continuous cylindrical body.

Each braided member 25 completely surrounds the outer circumference of the portions of the electric wires 10 that are led out from the end of the metal pipe 21. In other words, each braided member 25 completely surrounds the plurality of electric wires 10 that are led out from the end of the metal pipe 21. In this manner, the portions of the electric wires 10 exposed to the outside of the metal pipe 21 are electromagnetically shielded by the braided members 25.

As a material of the metal strand forming the braided member 25, for example, a metal material such as a copper-based material or an aluminum-based material can be used. In the present embodiment, the metal strand forming the braided member 25 is made of the same metal material as the metal pipe 21 (in this case, an aluminum-based metal material).

The protective tube 30 has a long tubular shape as a whole. As the protective tube 30, for example, a metallic or resin pipe, a flexible corrugated tube or rubber waterproof cover made of resin or the like, or the combination thereof can be used. In the protective tube 30 of the present example, an intermediate portion thereof in the axial direction (extending direction) is constituted by a metal pipe 21 that also functions as the electromagnetic shield portion 20. In addition, the protective tube 30 of the present example includes exterior materials 31 respectively provided at the two ends in the axial direction other than a portion formed by the metal pipe 21, and waterproof covers 32 that respectively bridge the space between the metal pipe 21 and the exterior materials 31.

The exterior material 31 surrounds the outer circumference of the braided member 25. The exterior material 31 is a flexible corrugated tube having, for example, a bellows structure in which annular recessed portions and annular protruding portions are alternately arranged along the axial direction (extending direction) thereof. Accordingly, the exterior material 31, which is a corrugated tube, can be elastically deformed in such a manner that its axis is curved or bent. The exterior material 31 is made of, for example, synthetic resin.

The waterproof cover 32, which covers the outer circumference of the connection portion between the metal pipe 21 and the braided member 25 and prevents water from entering, is attached to the connection portion. The waterproof cover 32 is fastened and fixed to the outside of the metal pipe 21 and the outside of the exterior material 31 by a band, a tape, or the like (not shown). The waterproof cover 32 is in airtight contact with the outside of the metal pipe 21 and the outside of the exterior material 31. The waterproof cover 32 is made of, for example, rubber or elastomer.

As shown in FIGS. 2 to 4, the fixing members 40 are attached to the outer circumferential surface of the metal pipe 21 to cover the holes 21X of the metal pipe 21. The fixing members 40 of the present example are attached to the outer circumferential surface of the metal pipe 21 to cover the entire protective members 23 that cover the holes 21X of the metal pipe 21.

Figure 5:
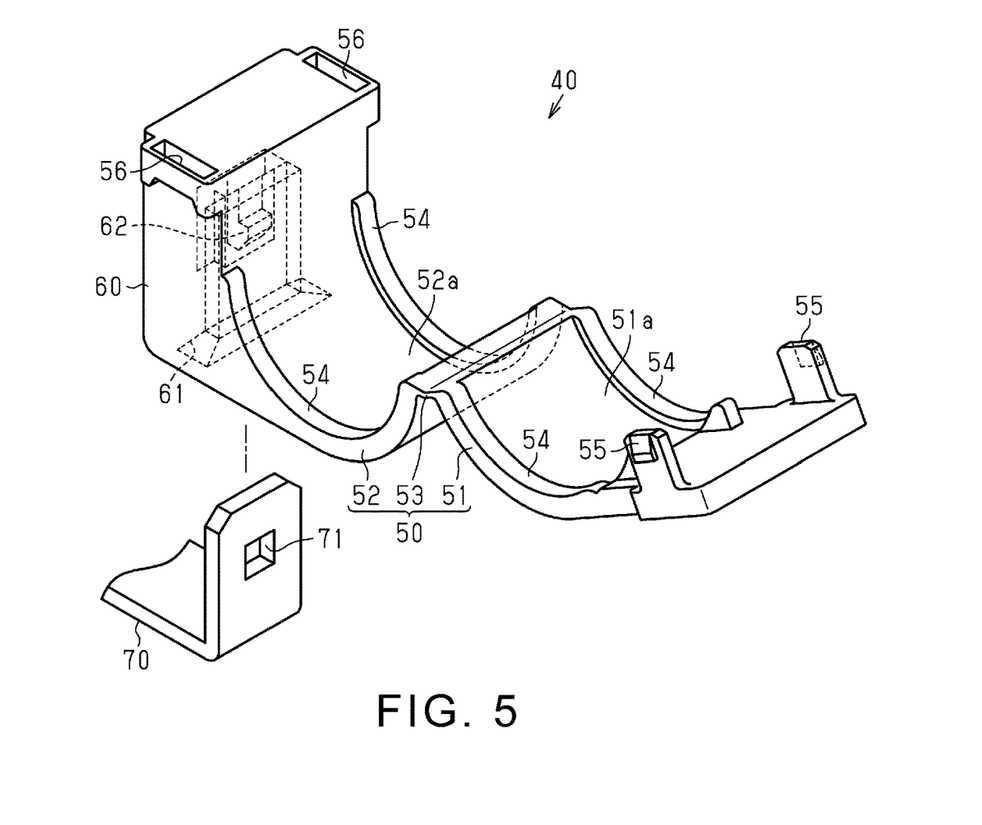
FIG. 5 is a perspective view of a fixing member in the embodiment.

As shown in FIG. 5, each fixing member 40 has a fitting portion 50 that is fitted onto the metal pipe 21, and a fixed portion 60 that is fixed to the vehicle body. The fixing member 40 is, for example, an integrated part in which the fitting portion 50 and the fixed portion 60 are integrally formed. The material of the fixing member 40 is preferably a material having a good thermal conductivity, for example. As the material of the fixing member 40, for example, a metal material such as an iron-based material or an aluminum-based material can be used. In the present embodiment, the fixing member 40 is made of the same metal material as the metal pipe 21 (in this case, an aluminum-based metal material).

The fitting portion 50 has a tubular shape (a cylindrical shape in this case) having a size capable of being fitted onto the metal pipe 21 as a whole. The fitting portion 50 has a pair of half bodies 51 and 52, and a connecting portion 53 that connects the half bodies 51 and 52. The pair of half bodies 51 and 52 are configured to be openable and closable with the connecting portion 53 as a fulcrum. The fitting portion 50 can fit the metal pipe 21 inside the fitting portion 50, by opening the pair of half bodies 51 and 52. Also, the fitting portion 50 can hold the metal pipe 21 inside the fitting portion 50, by closing the pair of half bodies 51 and 52. The fitting portion 50 of the present example is configured to have substantially cylindrical shape in a state where the pair of half bodies 51 and 52 are closed (in a combined state).

Most of the inner circumferential surfaces 51*a* and 52*a* of the half bodies 51 and 52 are formed into a curved surface curved in an arc shape, along the outer circumferential surface of the metal pipe 21. Each of the inner circumferential surfaces 51*a* and 52*a* is provided with a pair of protruding portions 54 protruding from the inner circumferential surfaces 51*a* and 52*a* inward in the radial direction of the fitting portion 50. The pair of protruding portions 54 is provided at an interval in the axial direction of the fitting portion 50. The pair of protruding portions 54 is respectively provided on the inner circumferential surfaces 51*a* and 52*a* at the two ends of the fitting portion 50 in the axial direction, for example. The protruding portions 54 are formed to extend continuously in the circumferential direction of the fitting portion 50. The pair of protruding portions 54 is formed in a substantially annular shape by the protruding portion 54 formed on the inner circumferential surface 51*a* and the protruding portion 54 formed on the inner circumferential surface 52*a*, in a state where the pair of half bodies 51 and 52 are closed.

The half body 51 has a pair of lock claws 55. The half body 52 has a pair of lock receiving portions 56. The pair of lock claws 55 and the pair of lock receiving portions 56 are coupled to each other by, for example, snap fitting. When the pair of the half bodies 51 and 52 is closed, and the lock claws 55 and the lock receiving portions 56 are engaged, the pair of half bodies 51 and 52 is locked together in a combined state. In a state where the pair of half bodies 51 and 52 is combined by this locking, the fitting portion 50 surrounds the metal pipe 21 over the entire circumference at a position in which the hole 21X and the protective member 23 are provided, and the fitting portion 50 can apply a predetermined fastening force to the portion. At this time, as shown in FIG. 4, most of the inner circumferential surfaces 51*a* and 52*a* of the half bodies 51 and 52 are in contact with the protective member 23. In the present embodiment, most of the inner circumferential surfaces 51*a* and 52*a* of the half bodies 51 and 52 press the protective member 23 toward the metal pipe 21. As a result, the protective member 23 of the present example is sandwiched between the metal pipe 21 and the fitting portion 50. Accordingly, the protective member 23 can be prevented from being separated from the metal pipe 21.

As shown in FIG. 3, the protective member 23 of the present example is accommodated in a space surrounded by the outer circumferential surface of the metal pipe 21 and the inner circumferential surface of the fixing member 40 (specifically, a space surrounded by the pair of protruding portions 54 and the inner circumferential surfaces 51*a* and 52*a* of the half bodies 51 and 52). As a result, because the protective member 23 is protected by the fixing member 40 (the fitting portion 50), damage to the protective member 23 can be suppressed.

The fixed portion 60 is provided on the half body 52, for example. A metallic bracket 70 that is fixed to a fixed portion such as a floor panel of the vehicle body by bolting or the like is attached to the fixed portion 60.

The fixed portion 60 is provided at a portion on the opposite side of the connecting portion 53 with respect to the central axis of the fitting portion 50, for example. An insertion opening 61 is opened on the end surface of the fixed portion 60. The bracket 70 is inserted into the insertion opening 61. An opening portion 71 is formed in the bracket 70. A claw portion 62 is formed in the insertion opening 61. When the bracket 70 is inserted into the insertion opening 61, the opening portion 71 of the bracket 70 and the claw portion 62 are coupled to each other by, for example, snap fitting. As a result, the protective tube 30 is held on the floor panel.

According to the present embodiment described above, the following actions and effects can be achieved.

(1) The holes 21X penetrating in a direction intersecting the axial direction of the metal pipe 21 are formed in the metal pipe 21. With this configuration, the heat generated in the electric wires 10 inserted into the metal pipe 21 can be released to the outside of the metal pipe 21 through the holes 21X of the metal pipe 21.

Further, the metallic fixing members 40 are provided on the outer circumferential surface of the metal pipe 21 to cover the holes 21X. The fixing members 40 are attached to the vehicle body. Accordingly, the heat released to the outside of the protective tube 30 through the holes 21X of the metal pipe 21 is diffused to the vehicle body having a large surface area through the fixing members 40, and is radiated to the atmosphere. At this time, because the fixing members 40 are made of a metal material having a good thermal conductivity, the heat generated in the electric wires 10 can be efficiently transferred to the vehicle body. In this manner, the heat generated in the electric wires 10 can be efficiently dissipated, and the heat dissipation of the wire harness 1 can be improved. As a result, the temperature rise in the electric wires 10 can be suppressed.

(2) Further, because the holes 21X are provided in the metal pipe 21, water can be discharged from the holes 21X, so that it is possible to suppress the accumulation of water inside the metal pipe 21.

(3) Each hole 21X of the metal pipe 21 is covered with the protective member 23 having the mesh 23X, which is smaller than the hole 21X. The protective members 23 can prevent foreign matter from entering the inside of the metal pipe 21 through the holes 21X. Further, even when the protective members 23 are provided, the heat generated in the electric wires 10 can be released to the outside of the metal pipe 21 through the mesh 23X of the protective members 23. Therefore, it is possible to suppress the entry of foreign matter into the metal pipe 21, while improving the heat dissipation of the wire harness 1.

(4) Each protective member 23 is made of a shield mesh in which a plurality of metal strands are woven. The electric wires 10 exposed to the outside of the holes 21X of the metal pipe 21 are electromagnetically shielded by the protective members 23 made of the shield mesh. Accordingly, the shielding performance of the wire harness 1 can be ensured, while improving its heat dissipation.

(5) The protective members 23 each having the mesh 23X are provided on the outer circumferential surface of the metal pipe 21, and the fixing members 40 are attached to the outer circumferential surface of the metal pipe 21 to cover the respective protective members 23. With this configuration, as compared with the case in which the fixing members 40 are directly attached to the outer circumferential surface of the metal pipe 21 having a smooth surface, positional displacement of the fixing members 40 in the axial direction and rotation of the fixing members 40 can be suppressed.

(6) The protective members 23 are formed to cover the entire outer circumferential surface of the metal pipe 21 in the circumferential direction. With this configuration, because the contact area between the inner circumferential surface of the fixing member 40 and the protective member 23 can be increased, positional displacement of the fixing members 40 in the axial direction and rotation of the fixing members 40 can be suitably suppressed.

(7) The joint portion 24 is provided at one end portion 23A of each sheet-like protective member 23, the sheet-like protective member 23 is wound around the outer circumferential surface of the metal pipe 21 in a sushi-roll shape (in other words, the protective member 23 is wound around the metal pipe 21 from the outside over the entire circumference), and the pair of end portions 23A are joined by the joint portion 24. Because the protective member 23 can be held in the wound state by the joint portion 24, it is not necessary to separately attach a member for holding the protective member 23 in the wound state.

(8) The holes 21X of the metal pipe 21 are provided at positions in which the fixing members 40 are attached in the axial direction of the metal pipe 21. With this configuration, the holes 21X can be used for positioning when the fixing members 40 are attached to the metal pipe 21. Therefore, the fixing members 40 can be easily positioned.

(9) The metal pipe 21, the protective members 23 (the shield meshes), and the fixing members 40 are made of the same type of metal. In this manner, if water adheres to the connecting portions of metal pipe 21, the protective members 23, and the fixing members 40, it is possible to suitably suppress the occurrence of electrolytic corrosion (galvanic corrosion).

OTHER EMBODIMENTS

The above embodiment may also be modified as follows.

In the above embodiment, one hole 21X is provided in the portion of the metal pipe 21 covered with one fixing member 40, but the number of holes 21X is not limited to any particular number.

Figure 6:
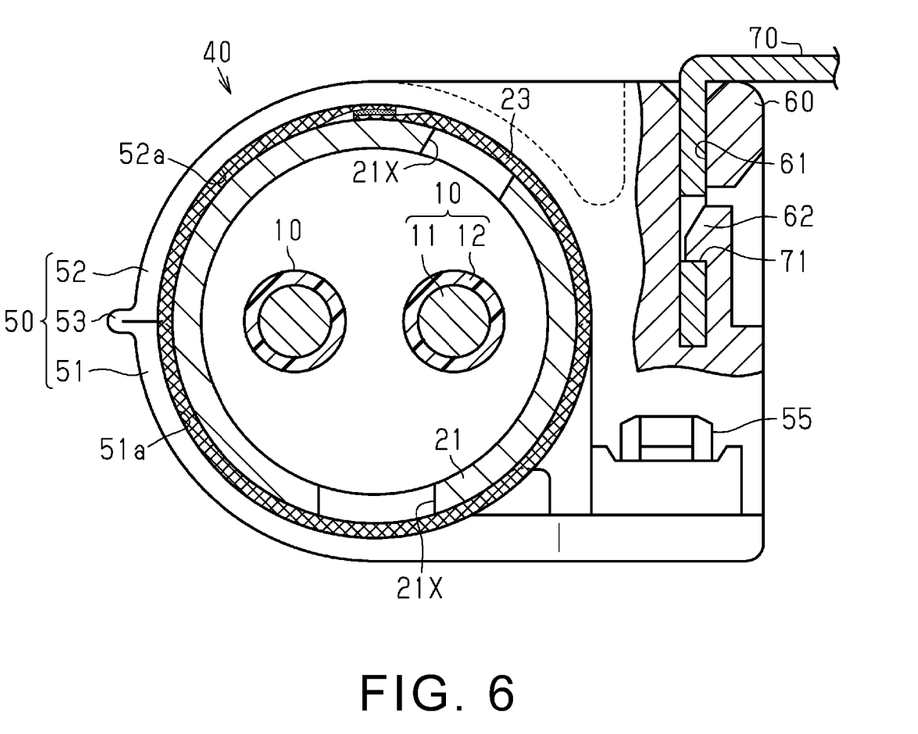
FIG. 6 is a schematic cross-sectional view of a wire harness according to a modification.

As shown in FIG. 6, for example, two or more (two in FIG. 6) holes 21X may also be formed in the metal pipe 21 in the portion covered with one fixing member 40. The plurality of holes 21X are formed at, for example, substantially the same positions in the axial direction of the metal pipe 21, and are formed at positions separated from each other in the circumferential direction of the metal pipe 21. The plurality of holes 21X are covered with one protective member 23, and are covered with one fixing member 40, for example. By providing the plurality of holes 21X in this manner, it is possible to cause one of the holes 21X to function as an intake port for taking outside air into the metal pipe 21, and cause the other hole 21X to function as an exhaust port for exhausting the air inside the metal pipe 21 to the outside. As a result, because the flow of air can be generated inside the metal pipe 21, heat is less likely to stay inside the metal pipe 21, and the heat dissipation of the wire harness 1 can be improved.

Note that the holes 21X are suitably provided at positions deviated from the joint portion 24 of the protective member 23 in the circumferential direction of the metal pipe 21. Also, each of the holes 21X may also be individually covered with a different protective member 23.

The joint portion 24 in the above embodiment may also be omitted.

In the above embodiment, the protective member 23 is formed to cover the entire circumference in the circumferential direction of the outer circumferential surface of the metal pipe 21, but the size and shape of the protective member 23 are not limited to a particular size and shape.

Figure 7:
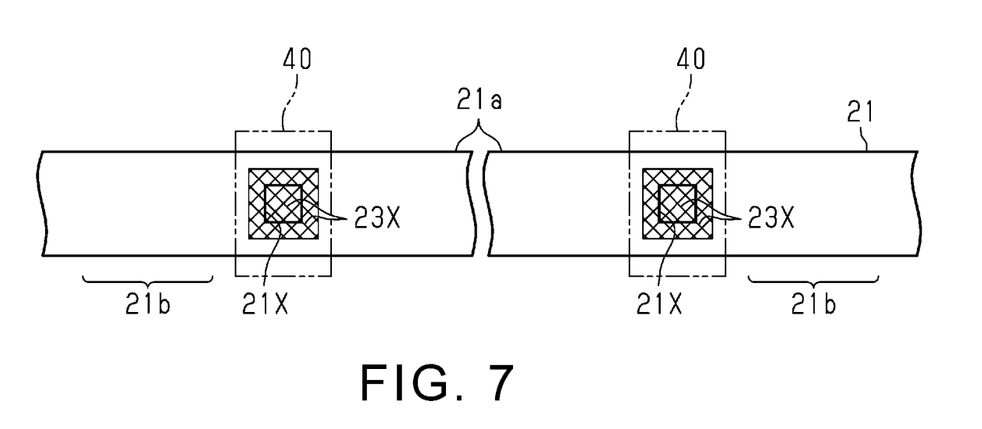
FIG. 7 is a schematic plan view of a wire harness according to another modification.

As shown in FIG. 7, for example, the protective member 23 may also be formed to be slightly larger than the hole 21X. The protective member 23 may also be formed in a substantially rectangular shape that is slightly larger than the hole 21X, for example. The protective member 23 is joined to, for example, the entire circumference of the outer circumferential surface of the metal pipe 21 surrounding the hole 21X.

Also, the protective member 23 may also be formed in a tubular shape.

The protective member 23 may also be formed, for example, by braiding a plurality of metal strands in a tubular shape.

The protective member 23 of the above embodiment may also be fixed to the outer circumferential surface of the metal pipe 21 by winding a tape or the like.

Although the protective member 23 is joined to the outer circumferential surface of the metal pipe 21 in the above embodiment, the protective member 23 may also be joined to the inner circumferential surface of the metal pipe 21.

Although the protective member 23 is joined to the metal pipe 21 in the above embodiment, the present disclosure is not limited to this. The joining of the protective member 23 to the metal pipe 21 may also be omitted, for example. In this case, for example, the protective member 23 is sandwiched between the metal pipe 21 and the fixing member 40.

In the above embodiment, the metal pipe 21 is formed in a substantially true cylindrical shape, but the present disclosure is not limited to this, and the metal pipe 21 may also be formed in an elliptic cylindrical shape or a rectangular cylindrical shape.

Figure 8:
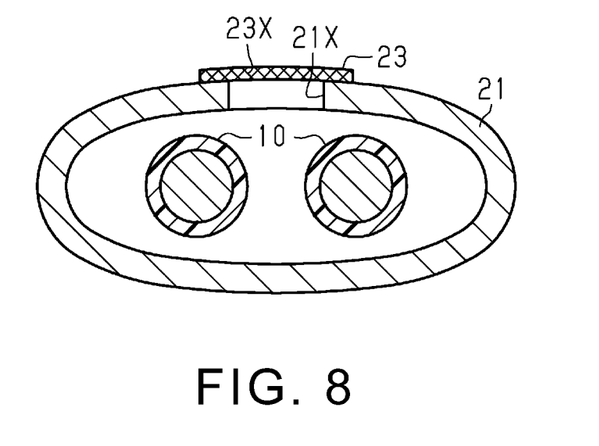
FIG. 8 is a schematic cross-sectional view of a wire harness according to still another modification.

As shown in FIG. 8, for example, if the metal pipe 21 is formed in an elliptic cylindrical shape, the hole 21X may also be provided in the outer circumferential surface in the major axis direction of the ellipse. In this case, the protective member 23 may also be joined to the outer circumferential surface of the elliptical metal pipe 21 in the major axis direction.

Note that the position at which the hole 21X is formed in the circumferential direction of the metal pipe 21 is not limited to a particular position, and the hole 21X may also be provided on the outer circumferential surface of the elliptical metal pipe 21 in the minor axis direction, for example.

In the above embodiment, the protective tube 30 is configured by the metal pipe 21, the exterior materials 31, and the waterproof covers 32, but the present disclosure is not limited to this. The protective tube 30 may also be configured only by the exterior material 31 such as a corrugated tube, for example. In this case, a hole penetrating in the radial direction of the exterior material 31 is formed at any position of the exterior material 31, and the protective member 23 and the fixing member 40 are provided to cover the hole. Inside the exterior material 31, for example, an electromagnetic shield member that completely surrounds the plurality of electric wires 10 is provided over substantially the entire length of the exterior material 31. As the electromagnetic shield member, for example, the braided member 25 of the above embodiment or a metal foil can be used.

In the above embodiment, the metal pipe 21, the protective members 23, and the fixing members 40 are made of the same type of metal, but the present disclosure is not limited to this. The metal pipe 21, the protective members 23, and the fixing members 40 may also be made of, for example, different types of metals.

In the above embodiment, the protective member 23 is made of a shield mesh, and the protective member 23 has the electromagnetic shield function, but the present disclosure is not limited to this. The protective member 23 may also be configured by braiding strands that are insulating, for example. In this case, for example, reinforcing fibers having excellent shear resistance can be used as the strands. Examples of the reinforcing fibers include para-aramid fibers, polyarylate fibers, PBO (polyp araphenylene benzobisoxazole) fibers, PET (polyethylene terephthalate) fibers, ultrahigh molecular weight polyethylene fibers, PEI (polyetherimide) fibers, glass fibers, and ceramic fibers, and it is preferable to use one or more of these fibers depending on physical properties required for the protective member 23. By forming the protective member 23 by weaving such reinforcing fibers, the impact resistance (in particular, the shear resistance) of the protective tube 30 can be improved.

The structure of the fixing member 40 in the above embodiment is not limited to any particular structure. The structure of the fixed portion 60 for fixing the fixing member 40 to the vehicle body is not limited to any particular structure, for example. The fixing member 40 may also be fixed to the vehicle body by bolt fastening or the like, for example.

Also, the structure of the fitting portion 50 fitted to the metal pipe 21 serving as the protective tube 30 is not limited to a particular structure. Protrusions that engages with the mesh 23X of the protective member 23 may also be formed, for example, on the inner circumferential surfaces 51a and 52a of the half bodies 51 and 52. By providing such protrusions, the positional deviation of the fixing member 40 can be suitably suppressed.

Further, in the above embodiment, the protruding portions 54 formed on the inner circumferential surfaces 51a and 52a of the half bodies 51 and 52 are not brought into contact with the protective member 23, but the protruding portions 54 may also be brought into contact with the protective member 23. In this case, for example, the protective member 23 is sandwiched between the outer circumferential surface of the metal pipe 21 and the protruding portions 54. Alternatively, the protruding portions 54 may also be omitted.

Figure 9:
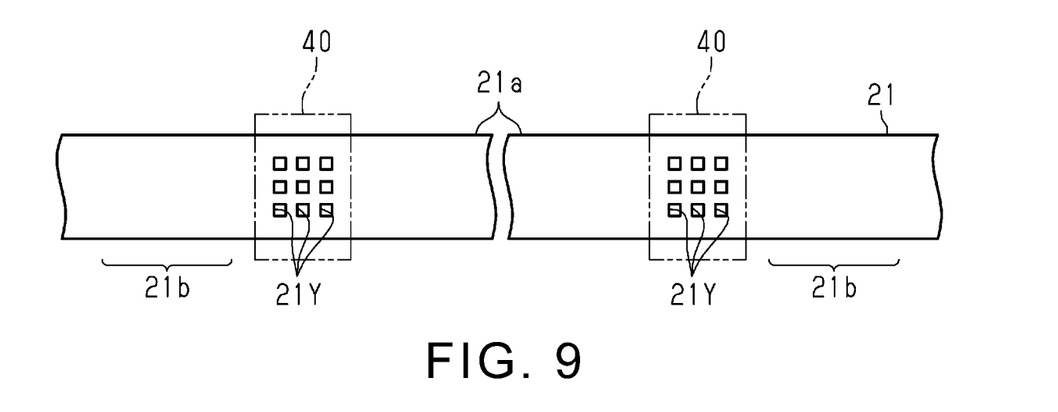
FIG. 9 is a schematic plan view of a wire harness according to still another modification.

In the above embodiment, the net-like protective member 23 is provided to cover the hole 21X of the metal pipe 21, but the protective member 23 may also be omitted. As shown in FIG. 9, for example, a plurality of small holes 21Y may also be formed in the metal pipe 21, and the fixing member 40 may also be directly attached to the outer circumferential surface of the metal pipe 21 to cover the plurality of holes 21Y. The plurality of holes 21Y may also be formed in a grid pattern, for example.

In the above embodiment, the number of electric wires 10 inserted into the protective tube 30 is two, but the number of electric wires 10 is not limited to a particular value, and the number of electric wires 10 can be changed according to the specifications of the vehicle. The number of electric wires inserted into the protective tube 30 may also be, for example, one, or may also be three or more. A low-voltage electric wire that connects a low-voltage battery and various low-voltage devices (e.g., a lamp, a car audio device, etc.) may also be added as an electric wire inserted into the protective tube 30, for example.

In the above embodiment, although the electric wire 10 is embodied as a non-shielded electric wire, the type of the electric wire 10 is not limited to this type of electric wire. The electric wire 10 may also be embodied as a shielded electric wire having a shield structure, for example.

The arrangement relationship between the inverter 3 and the high-voltage battery 4 in the vehicle is not limited to the above embodiment, and may also be changed as appropriate according to the configuration of the vehicle.

In the above embodiment, the inverter 3 and the high-voltage battery 4 are adopted as the electric devices connected by the electric wire 10, but the present disclosure is not limited to this. The present disclosure may also be applied, for example, to an electric wire that connects the inverter 3 and a wheel driving motor. In other words, the present disclosure can be applied to any component that electrically connects electric devices installed in a vehicle.

The above-described embodiment and modifications may also be combined as appropriate.

It will be apparent to those skilled in the art that the present disclosure may also be embodied in other specific forms without departing from the technical idea of the disclosure. Some of components described in the embodiment (or one or more aspects thereof) may also be omitted, or some components may also be combined, for example. The scope of the present disclosure should be determined with reference to the appended claims, along with the full scope of equivalents to which such claims are entitled.

The invention claimed is:

1. An apparatus comprising:
   a protective tube that surrounds an electric wire that is routed in a vehicle; and
   a metallic fixing that is attached to the protective tube, and that is fixed to the vehicle, wherein:
   the protective tube includes a hole penetrating in a direction intersecting an axial direction of the protective tube,
   the metallic fixing is attached to an outer circumferential surface of the protective tube to cover the hole and is pressed toward the protective tube to prevent a protective member between the hole and the metallic fixing separating from the protective tube,
   the protective member is attached to the protective tube and has a mesh covering the hole,
   the protective tube includes a shield pipe that electromagnetically shields the electric wire,
   the mesh of the protective member is a net shield mesh that electromagnetically shields the electric wire, and
   the protective tube, the protective member, and the metallic fixing are made of a same type of metal.

2. The apparatus according to claim 1, wherein
   the protective member is attached to the outer circumferential surface of the protective tube.

3. The apparatus according to claim 1, wherein
   the protective member is formed to cover an entire circumference of the protective tube in a circumferential direction.

4. The apparatus according to claim 1, wherein
   the protective tube includes a plurality of holes arranged in a grid pattern, and
   the metallic fixing is attached to the protective tube to cover the holes arranged in the grid pattern.

5. A wire harness, comprising:
   the apparatus according to claim 1; and
   the electric wire inserted into the protective tube.

6. The apparatus according to claim 1, wherein
   the protective member is a sheet-like member that is wound around an entire circumference of the protective tube.

* * * * *